United States Patent [19]

Coleman

[11] 4,454,554

[45] Jun. 12, 1984

[54] COIL BOBBIN

[75] Inventor: Howard R. Coleman, Elyria, Ohio

[73] Assignee: The General Industries Company, Elyria, Ohio

[21] Appl. No.: 404,554

[22] Filed: Aug. 2, 1982

Related U.S. Application Data

[63] Continuation of Ser. No. 172,799, Jul. 28, 1980, abandoned.

[51] Int. Cl.³ .......... H02H 7/04

[52] U.S. Cl. .......... 361/41; 310/68 C

[58] Field of Search .......... 361/41, 104; 336/198, 336/208; 310/68 C, 194, 214

[56] References Cited

U.S. PATENT DOCUMENTS 3,553,621 1/1971 Lane .......... 310/68 C X 3,691,425 9/1972 Weyrich et al. .......... 361/41

4,112,405 9/1978 Joseph .......... 310/68 C X

*Primary Examiner*—Reinhard J. Eisenzopf

*Attorney, Agent, or Firm*—J. H. Slough

[57] ABSTRACT

An electromagnetic coil construction consisting of a bobbin having a primary winding and a secondary winding, the bobbin having an end flange at either end of the hub and a central separator flange intermediately spaced between the first and second flanges, the separator flange having a through opening into which a thermal sensing device electrically, interconnected in series with the primary winding or a secondary winding is adapted to be interposed whereby the device is in physical contact with both the primary and the secondary winding to interrupt the circuit upon overheating of either or both windings.

6 Claims, 22 Drawing Figures

COIL BOBBIN

This is a continuation, of application Ser. No. 172,799 filed July 28, 1980, now abandoned.

This invention relates to improvements in coil constructions and coil protection devices for motors with transformer windings.

Coil constructions of the prior art have commonly been provided with coil winding bobbins or spools provided with thermal sensing device, fuses, circuit breakers, switches or the like (hereinafter termed "fuses") to protect the motor against winding burn-up or a hot coil for any reason involving over-temperature conditions. Such fuses have commonly been physically mounted on the coil or bobbin by taping or the like or inserted into pockets in the bobbin and then connected to the coil winding.

U.S. Pat. No. 3,959,675 issued May 25, 1976 to Max E. Lautner et al, discloses a projecting portion provided on the outer side of a coil-bobbin end flange having a cavity divided into two chambers, one of which is adapted to act as a pocket to receive a thermal sensing device therein separated from the coil by a thin side wall. U.S. Pat. No. 4,112,405 issued Sept. 5, 1978 to Mark Joseph discloses an end flange of a plastic coil-bobbin having a recess therein with its open side facing a winding area into which recess a thermal fuse in an electrically insulated housing is pressed and faces a winding area in the bobbin, the fuse being connected in series with the coil:

Other patents disclosing the attachment of fuses to the bobbin or winding as by taping, mounting, etc. or insertion into an end flange of the bobbin include U.S. Pat. No. 3,585,450 issued June 15, 1972, U.S. Pat. No. 3,691,425 dated Sept. 12, 1972, Canadian Letters Pat. No. 973,263 dated Aug. 19, 1975, U.S. Pat. No. 3,875,439, U.S. Pat. No. 3,219,856 dated Nov. 23, 1965 and U.S. Pat. No. 3,405,317 dated Oct. 8, 1968.

The present invention involves a coil construction for motors with transformer primary and secondary windings having coil protection means interposed in intimate relationship with a winding area of both windings and a method of assembling the said coil construction comprising an integral plastic bobbin having a hub and a pair of end flanges, a central plastic separator flange having a through opening therein adapted to separate the primary and secondary windings, a fuse being located in said opening in the separator flange, the fuse being sensitive to heat generated in either or both the primary and secondary windings.

An object of the invention is therefore to provide a fuse in a motor with transformer windings which is sensitive to temperatures of either or both the primary or secondary windings.

Another object of the invention is to enable the use of the maximum thermal fuse rating and still protect the motor from over-heating.

A further object of the invention is to prevent nuisance tripping of the fuse.

A still further object of the invention is to provide easy assembly of the fuse after the windings have been placed on the coil.

Another object of the invention is to provide a simple and economical method of assembly of the transformer and protection means and efficient and highly effective operation thereof.

Other objects of my invention and the invention itself will become more readily apparent from the following description and the appended drawings, in which drawings.

FIGS. 14 to 22 inclusive are perspective views of sequential steps in the assembly of the coil construction beginning with the start of the winding of the secondary, the primary winding, the assembly of the fuse into a slot in the central flange, the wrapping of the windings, and attachment of the fuse connections and terminals.

Figure 1:
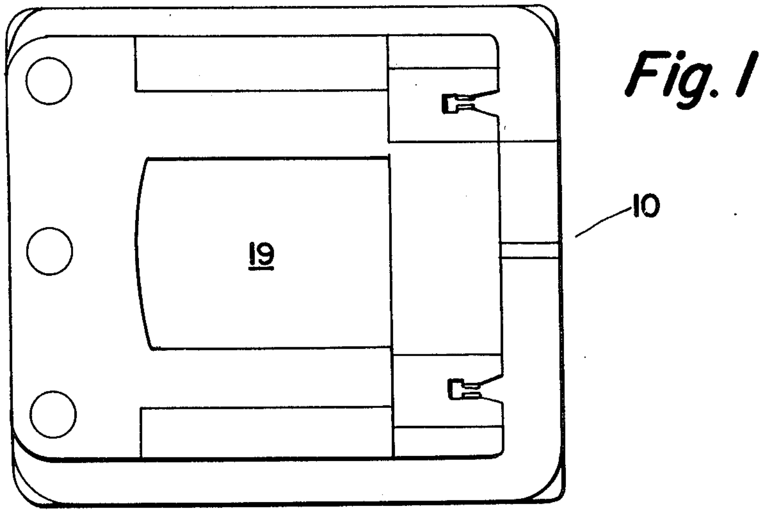
FIG. 1 is an end elevational view of the bobbin of my invention.
Figure 2:
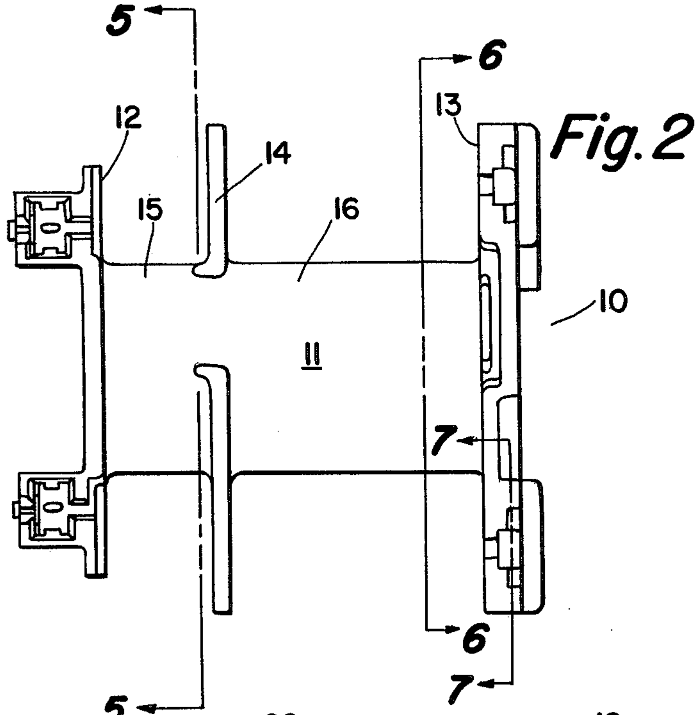
FIG. 2 is a side elevational view thereof.
Figure 6:
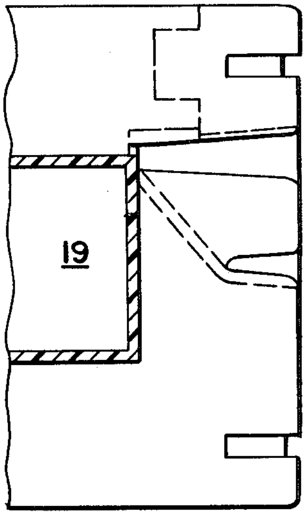
FIG. 6 is a fragmentary enlarged view taken from the line 6—6 of FIG. 2.
Figure 7:
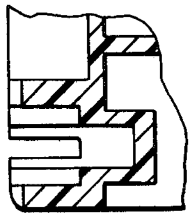
FIG. 7 is a fragmentary enlarged view taken from the line 7—7 of FIG. 2.
Figure 5:
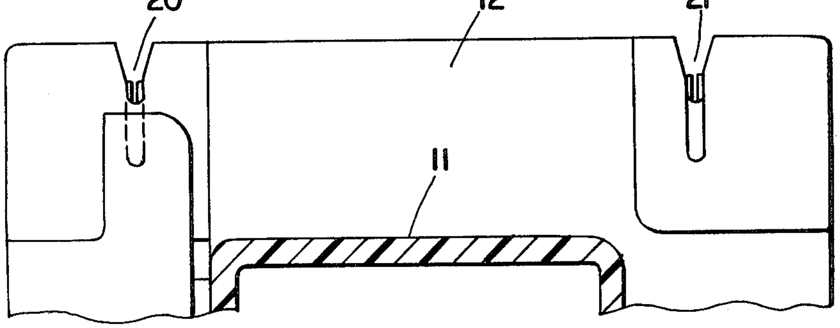
FIG. 5 is a fragmentary enlarged view taken from the line 5—5 of FIG. 2.
Figure 3:
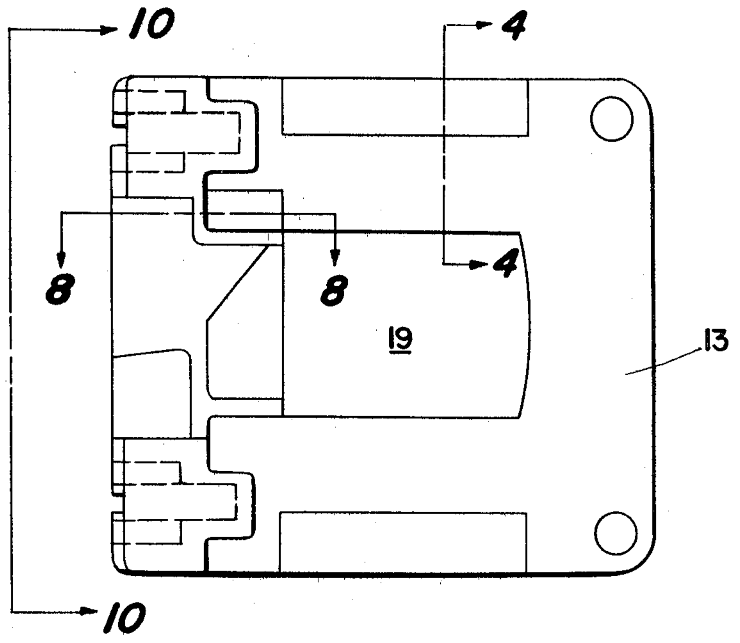
FIG. 3 is an end elevational view taken from an opposite end of the bottom of FIG. 1.
Figure 4:
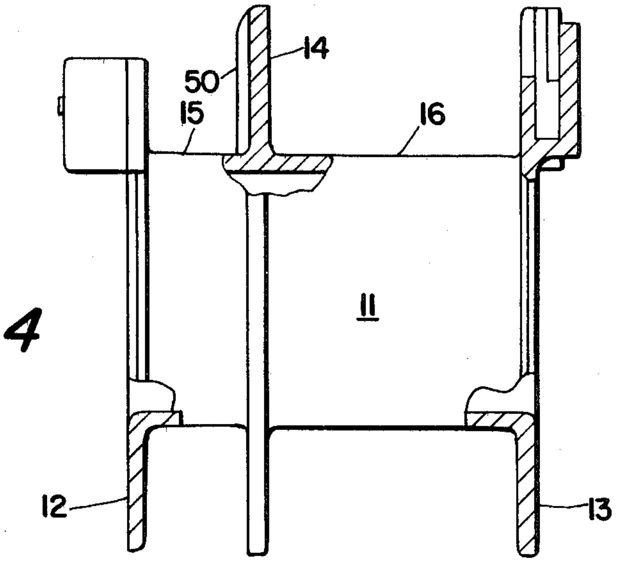
FIG. 4 is an enlarged view taken from the line 4—4 of FIG. 3.
Figure 8:
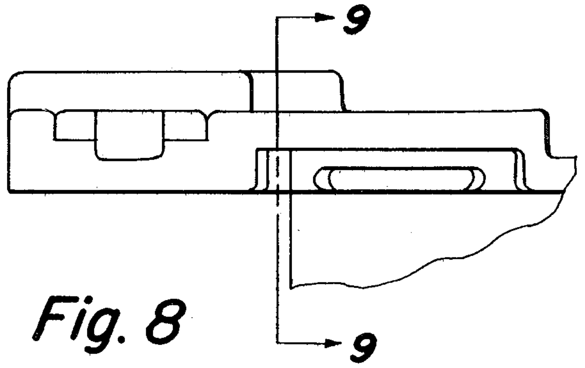
FIG. 8 is an enlarged fragmentary view taken from the line 8—8 of FIG. 3.
Figure 9:
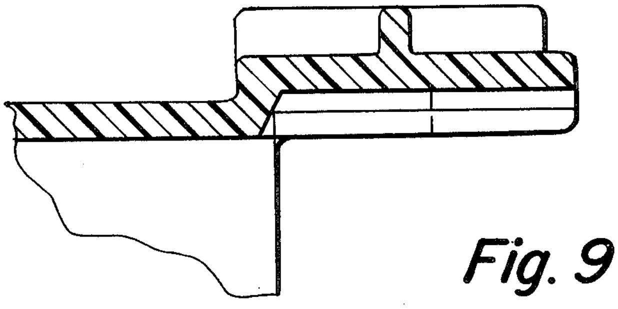
FIG. 9 is an enlarged view taken from the line 9—9 of FIG. 8.
Figure 10:
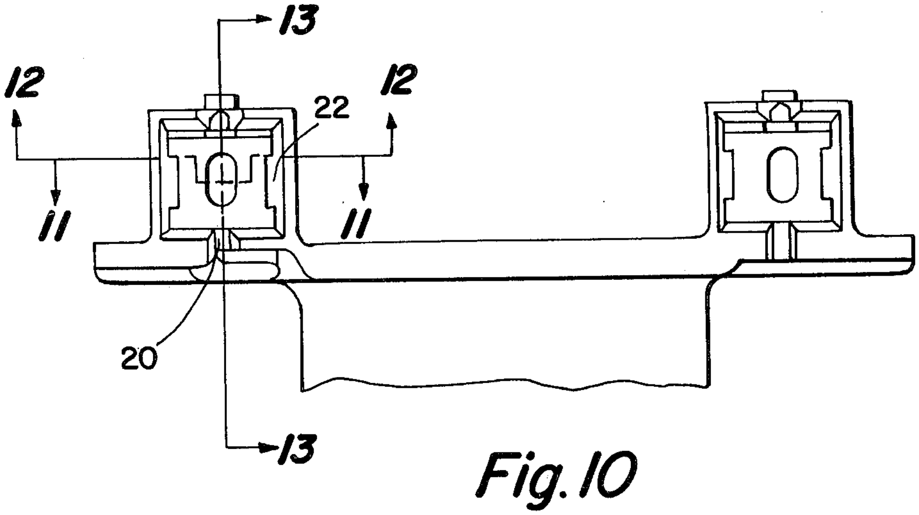
FIG. 10 is an enlarged view taken on line 10—10 of FIG. 3.
Figure 11:
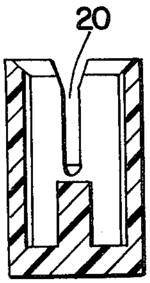
FIG. 11 is an enlarged sectional view taken on the line 11—11 of FIG. 3.
Figure 12:
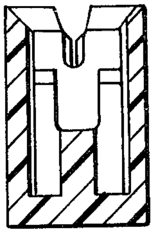
FIG. 12 is an enlarged sectional view taken on the line 12—12 of FIG. 10.
Figure 13:
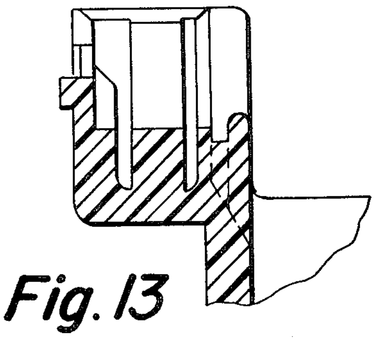
FIG. 13 is an enlarged sectional view taken on the line 13—13 of FIG. 10.

Referring now to the drawings in all of which like parts are designated by like reference numerals, and referring more particularly to FIGS. 1 and 2, a bobbin assembly indicated generally at 10 comprises a tubular hub 11, a pair of integrally associated outer spaced terminal end flanges 12 and 13, a central separator flange 14 separating the bobbin into wind portions 15 and 16 for the secondary and primary windings 17 and 18, respectively. The bobbin is preferably formed of molded plastic material such as nylon or nylon and glass, or other material having good electrical insulating properties. It will be noted that, in the form of the invention shown herein, the bobbin is of generally rectangular configuration and the end flanges 12 and 13 extend generally normal to the longitudinal axis of the core passage 19. The bobbin thus provides a former around which the turns of the secondary and primary are wound.

The end flanges as shown are provided with wind slots 20—20, 21—21, said slots leading into pockets 22, 22' disposed laterally on either side of the upper portion of the end flanges 12 and 13.

It is to be noted that the invention relates primarily to the location of a fuse in an opening in a central flange or separator disposed perpendicularly to the longitudinal core axis and that the fuse becomes a part of the dielectric barrier between the primary and secondary windings thus is sensitive to heat generated in either or both windings.

Preferably the space provided in the opening in the separator is such as to provide easy assembly of the fuse after the windings are placed on the spool. A preferred embodiment of the invention as best illustrated in FIGS. 4, 16, 17, 18 et al discloses the provision of narrow ribs 50 edging or adjacent to the slot 40 which under high temperatures are designed to distort during the abnormal operation and allow for more intimate contact of the magnet wire to the fuse for better heat transfer. The ribs may be placed on either the primary or the secondary side of the central flange 14.

Figure 14:
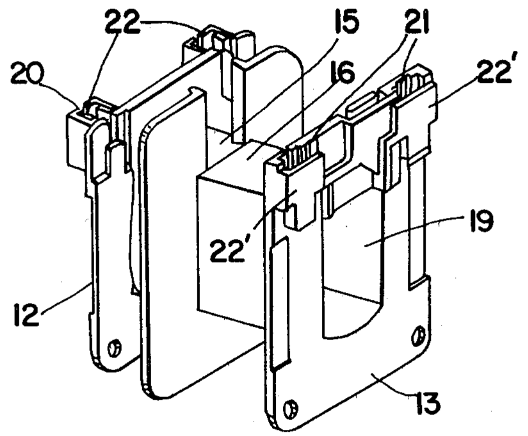
Figure 15:
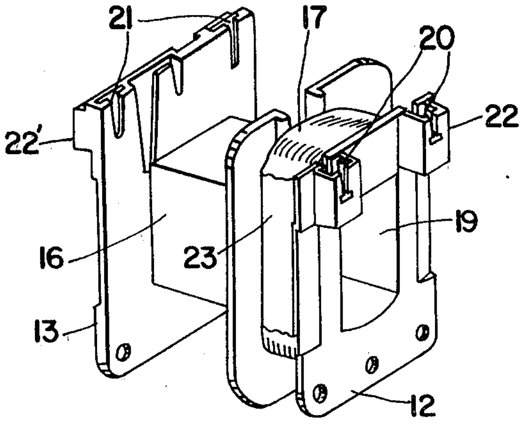
Figure 16:
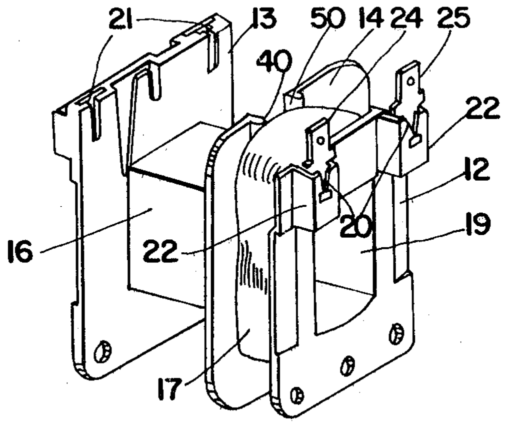

To assemble the improved fuse protected transformer of my invention, a preferred method is to introduce the start of the winding 15 of the secondary 17 through one of the wind slots 20 before the secondary is wound on the bobbin on the wind space 15 provided on the hub between the end flange 12 and the central separator flange 14 as shown in FIG. 14. The bobbin is then rotated 180° as shown in FIG. 15 and the finish end of the secondary wind is taped to the coil as shown at 23. The hold down tape 23 is then removed and the start and finish magnet wire of the secondary is placed loosely in the wide portion of the slots 20, 21, beneath the terminals 24, 25 and the terminals are forced into the pocket and down and over the magnet wire and trims any excess therefrom.

Figure 17:
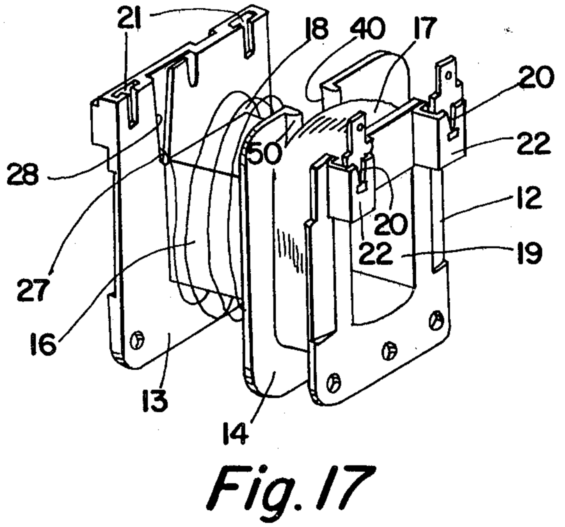

As shown in FIG. 17 the start 27 of the primary winding 18 is then introduced into the wind slot 28 and the said primary winding 18 is wound on the hub of the spool or bobbin disposed between the central separator flange 14 and the end flange 13 with the specified type wire and turns. The primary finish wires are then taped with tape 30 to hold the wind in position.

Figure 18:
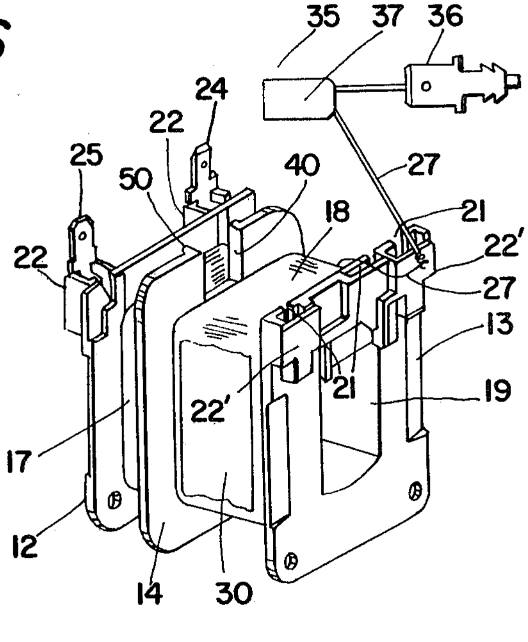

The primary start wire 27 is then connected in series and soldered to a fuse 35 and terminal assembly 36 shown in FIG. 18 and any excess wire is trimmed off.

Figure 19:
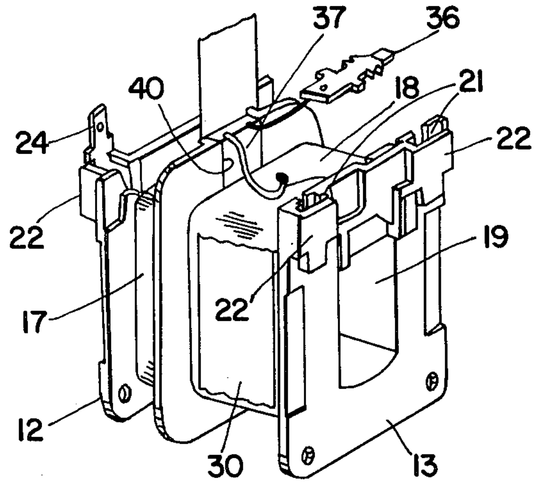
Figure 20:
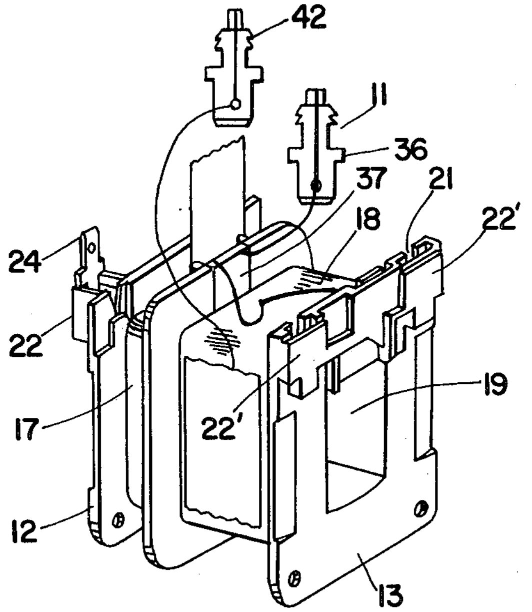
Figure 21:
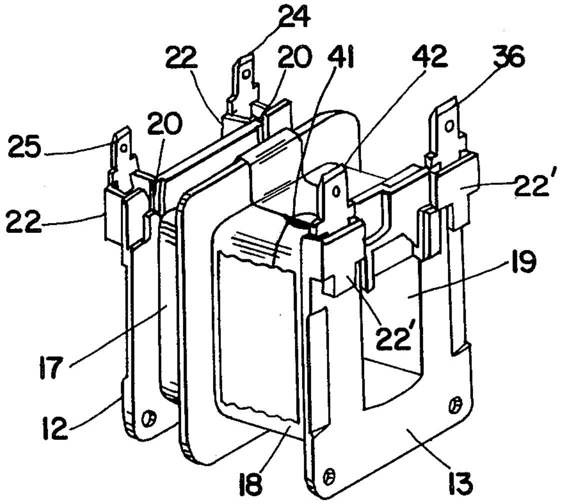
Figure 22:
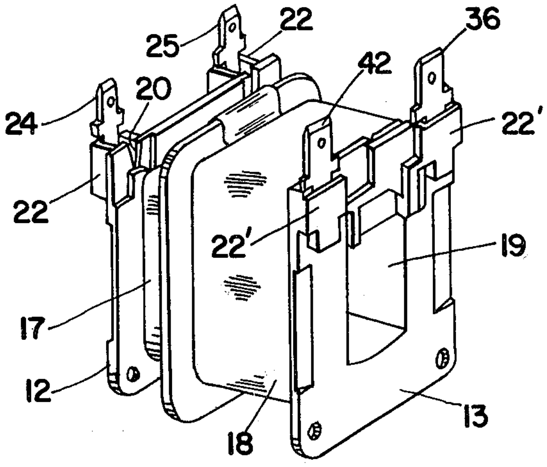

The body 37 of the fuse 35 is then inserted into a notch or through an opening 40 in the central flange 14 and held in position therein as shown in FIGS. 19 and 20 and the fuse body and fuse leads are covered with tape as shown in FIGS. 20, 21 and 22. The secondary coil is then wrapped as best shown in FIG. 20 and the terminal 42 is crimped to the finish 41 of the primary wire as shown in FIG. 21. The terminals are then pressed into the flange pockets 22', 22'. The fuse leads and coil slack loops are then positioned down onto the tape wrap and the primary coil is wrapped as shown in FIG. 22.

It is to be understood that the fuse could be electrically interconnected in series with either the primary or secondary winding, as desired in motors of different construction.

Although I have described and shown by invention in connection with preferred embodiments thereof, and in connection with a preferred assembly thereof, it will be understood that numerous and extensive departures may be made therefrom without, however, departing from the spirit of the invention and the scope of the appended claims.

What I claim is:

1. An electromagnetic coil construction containing a bobbin having a primary winding and a secondary winding, comprising:

said bobbin having an axial hub, a first end flange at one end of the hub and a second end flange at the other end of the hub wherein both end flanges are disposed normal to the axis, and a separator flange integral with the hub and end flanges and disposed normal to the axis and intermediately spaced between said first and said second end flange, said separator flange having a through opening therein, primary windings wound on the hub between said first end flange and said separator flange, and secondary windings wound on the hub between said second end flange and said separator flange;

a thermal sensing device electrically interconnected in series with said primary winding or a secondary winding and inserted into said opening in the separator flange in communication with said primary and secondary windings whereby said thermal sensing device is in physical contact with both said primary windings and said secondary windings whereby overheating in either the primary windings or the secondary windings or both windings activates said thermal sensing device to interrupt the circuit; and integral spacing means provided adjacent the periphery of said opening adapted to distort under overheating conditions.

2. The electromagnetic coil constructions of claim 1 wherein the thermal sensing device is a fuse with integral insulation and forms with the separator flange a dielectric barrier between the primary and secondary windings.

3. The electromagnetic coil construction in claim 1 wherein the spacing means is a rib surrounding the periphery of said opening in said central flange which said rib is adapted to distort due to abnorma heat in the adjacent winding to provide more intimate contact between the winding and said thermal sensing device.

4. The electromagnetic coil construction in claim 3 wherein said spacing means is a rib disposed in contact with the primary windings.

5. The electromagnetic coil construction in claim 4 wherein said spacing means is a rib disposed in contact with said secondary windings.

6. The electromagnetic coil construction in claim 4 wherein the spacing means includes a second rib wherein the first rib is in contact with the primary windings and the second rib is in contact with the secondary windings.

* * * * *

UNITED STATES PATENT AND TRADEMARK OFFICE

CERTIFICATE OF CORRECTION

PATENT NO. : 4,454,554

DATED : June 12, 1984

INVENTOR(S) : HOWARD R. COLEMAN

It is certified that error appears in the above-identified patent and that said Letters Patent is hereby corrected as shown below:

Column 3, line 50, should correctly read as follows:

Although I have described and shown my invention in...

Column 4, line 40, claim 3, should correctly read as follows:

...said rib is adapted to distort due to abnormal heat in the...

Signed and Sealed this

*Thirtieth* Day of *October 1984*

[SEAL]

*Attest:*

GERALD J. MOSSINGHOFF

*Attesting Officer* *Commissioner of Patents and Trademarks*